(12) United States Patent
Kohama (10) Patent No.: US 7,878,548 B2
(45) Date of Patent: Feb. 1, 2011

(54) PRETENSIONER AND SEAT BELT APPARATUS

(75) Inventor: Shigeru Kohama, Tokyo (JP)

(73) Assignee: Takata Corporation, Tokyo (JP)

( * ) Notice: Subject to any disclaimer, the term of this patent is extended or adjusted under 35 U.S.C. 154(b) by 234 days.

(21) Appl. No.: 12/314,221

(22) Filed: Dec. 5, 2008

(65) Prior Publication Data
US 2009/0184508 A1    Jul. 23, 2009

(30) Foreign Application Priority Data
Jan. 23, 2008    (JP) ............... 2008-012446

(51) Int. Cl.
*B60R 22/46* (2006.01)
(52) U.S. Cl. .................... 280/806; 297/480
(58) Field of Classification Search ............. 280/806; 297/480
See application file for complete search history.

(56) References Cited

U.S. PATENT DOCUMENTS

| | | | |
|---|---|---|---|
| 6,039,353 A * | 3/2000 | Bauer et al. | 280/806 |
| 6,186,549 B1 * | 2/2001 | Specht et al. | 280/806 |
| 6,250,682 B1 * | 6/2001 | Betz et al. | 280/806 |
| 6,250,720 B1 * | 6/2001 | Wier | 297/468 |
| 6,299,211 B1 * | 10/2001 | Wier | 280/806 |
| 6,877,776 B2 | 4/2005 | Ukita et al. | |
| 2003/0122362 A1 | 7/2003 | Ukita et al. | |
| 2009/0014989 A1 * | 1/2009 | Henderson et al. | 280/730.2 |

FOREIGN PATENT DOCUMENTS

| | | |
|---|---|---|
| JP | 2003-146184 | 5/2003 |
| JP | 2007-62600 | 3/2007 |
| JP | 2007-76493 | 3/2007 |

* cited by examiner

*Primary Examiner*—Faye M. Fleming
*Assistant Examiner*—Karen A Beck
(74) *Attorney, Agent, or Firm*—Foley & Lardner LLP (57) ABSTRACT

A pretensioner for restraining an occupant with a seat belt by pulling the seat belt when an impact on a vehicle is generated. The pretensioner comprises a retaining ring having a ring to be in contact with an end of a seal member facing a protective member and a plurality of projections to be in press contact with the inner wall of a housing that project radially outwardly from the periphery of the ring, wherein the retaining ring is press fitted into the housing so that the seal member is fixed to the inner wall of the housing by the retaining ring.

10 Claims, 5 Drawing Sheets

PRETENSIONER AND SEAT BELT APPARATUS

BACKGROUND

The present invention relates to a pretensioner that pulls a seat belt at the time of a rapid deceleration of a vehicle and relates to a seat belt apparatus.

Conventionally, vehicle seats are equipped with seat belt apparatuses for restraining occupants each of which prevents the occupant from being moved forward due to an inertial force when an impact is generated, for example, at the time of a rapid deceleration or a collision of the vehicle. Such a seat belt apparatus is generally provided with an Emergency Locking Retractor (hereinafter, referred to as an ELR) which does not restrain motion of the occupant in normal driving but locks a winding shaft for the seat belt to prevent the seat belt from being further withdrawn only when an impact is generated to the vehicle. The ELR locks the winding shaft within a very short time after detecting a deceleration of a predetermined value or more, thereby preventing the seat belt from being further withdrawn.

However, according to the aforementioned ELR which merely locks the winding shaft, in case where the seat belt is loosely wound onto the winding shaft when worn by the occupant, a certain amount of the seat belt may be withdrawn even when the winding shaft is locked. Even when the seat belt is not loosely wound, the seat belt may still be withdrawn between the time of detection of a deceleration of the predetermined value or more and the time of locking of the winding shaft.

As a device for canceling the looseness of the seat belt and the withdrawal of the seat belt caused by the time lag until the winding shaft is locked to some extent, there is known a pretensioner which pulls the seat belt buckle when a predetermined deceleration is detected disclosed in Japanese Patent Application JP-A-2003-146184 (FIG. 2 and FIG. 4), incorporated by reference herein.

The pretensioner as disclosed in Japanese Patent Application JP-A-2003-146184 comprises a wire of which one end is connected to a seat belt buckle and the other end is fixed to a piston in a cylinder and a housing through which the wire is passed and which supports the cylinder. When a deceleration of the vehicle is detected, high-pressure gas is spouted into a gas chamber formed in the housing so as to move the piston, thereby pulling the wire.

Mounted on the other side of the housing from the cylinder is a holder having a guide hole for guiding the wire toward the cylinder. A protection member (guard pipe) for protecting the wire is disposed inside the gas chamber to cover the outer periphery of the wire and a seal member is disposed on the other side of the housing from the cylinder to seal between the gas chamber and the guide hole of the holder.

The seal member is fixed inside the housing to prevent the seal member from being pulled according to the pulling of the wire during the actuation of the pretensioner. For fixing the seal member inside the housing, generally, a plurality of engaging claws are formed by metallic molding at a plurality of locations in the circumferential direction of the inner wall of the housing and these claws are crimped to hold the seal member.

In some existing pretensioners, engaging claws which are molded as a part of the housing may be crimped to fix the seal member inside the housing. However, when the housing is made of a material having a relatively low ductility, such as a die-cast aluminum alloy, it is difficult to fix the seal member.

When the housing is a die-casting product made of aluminum alloy, reduction in weight of the housing is achieved. However, since the material has a low ductility, it is difficult to efficiently crimp the engaging claws to hold the seal member. That is, it is difficult to fix the seal member inside the housing by crimping the claws.

SUMMARY

One disclosed embodiment relates to a pretensioner for restraining an occupant with a seat belt by pulling the seat belt when an impact on a vehicle is generated. The pretensioner comprises a wire of which one end is connected to the seat belt; a piston that is connected to the other end of the wire to pull the wire; a cylinder that accommodates the piston slidably; a housing through which the wire is inserted and that holds the cylinder at one end thereof; and a holder that is located at the other end of the housing and has a guide hole for guiding the wire toward the cylinder. The pretensioner further comprises a gas generator that supplies gas for moving the piston into the cylinder through a gas chamber formed in the housing and a protective member for protecting the wire that is disposed in the gas chamber within the housing to cover at least an outer periphery of the wire facing the gas generator. The pretensioner further comprises a seal member that is located within the housing at a side of the protective member opposite to the cylinder side to seal between the gas chamber and the guide hole of the holder and through which the wire is inserted. The pretensioner further comprises a retaining ring having a ring to be in contact with an end of the seal member facing the protective member and a plurality of projections to be in press contact with the inner wall of the housing that project radially outwardly from the periphery of the ring, wherein the retaining ring is press fitted into the housing so that the seal member is fixed to the inner wall of the housing by the retaining ring.

Another embodiment relates to a seat belt apparatus including a seat belt, a retractor that winds up the seat belt, a tongue supported by the seat belt, and a pretensioner for restraining an occupant with the seat belt by pulling the seat belt when an impact on a vehicle is generated.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5(*a*) is a front view showing a retaining ring to be used for fixing the protective seal and FIG. 5(*b*) is a vertical sectional view thereof.

DETAILED DESCRIPTION

According to an exemplary embodiment, a seat belt apparatus includes: a seat belt; a retractor that winds up the seat belt; and a tongue supported by the seat belt. The seat belt apparatus further includes a pretensioner for restraining an occupant with the seat belt. As a sudden stop or a collision of the vehicle occurs, the pretensioner may be actuated to better restrain the occupant with the seat belt. The pretensioner restrains an occupant with a seat belt by pulling the seat belt when an impact on a vehicle occurs.

According to one exemplary embodiment, the pretensioner comprises a wire of which one end is connected to the seat belt; a piston that is connected to the other end of the wire to pull the wire; a cylinder that accommodates the piston slidably; a housing through which the wire is inserted and that holds the cylinder at one end thereof; and a holder that is located at the other end of the housing and has a guide hole for guiding the wire toward the cylinder. The pretensioner further comprises a gas generator that supplies gas for moving the piston into the cylinder through a gas chamber formed in the housing and a protective member for protecting the wire that is disposed in the gas chamber within the housing to cover at least an outer periphery of the wire facing the gas generator. The pretensioner further comprises a seal member that is located within the housing at a side of the protective member opposite to the cylinder side to seal between the gas chamber and the guide hole of the holder and through which the wire is inserted.

The pretensioner is actuated so that high-pressure gas from the gas generator is supplied into the cylinder through the gas chamber in the housing and the piston within the cylinder is moved, thereby pulling the wire and, in turn, the seat belt. The seal member is fixed inside the housing to keep the seal member stationary.

According to an exemplary embodiment, the pretensioner further comprises a retaining ring to fix the seal member inside the housing. The retaining ring is a simple structure made of an elastic metal and comprises a ring and a plurality of projections that project radially outwardly from the periphery of the ring. The ring is in contact with an end of the seal member facing the protective member and the plurality of projections are in press contact with the inner wall of the housing. The retaining ring is press fitted into the housing so that the seal member is fixed to the inner wall of the housing by the retaining ring.

The ring of the retaining ring is brought in contact with the end of the seal member facing the protecting member and the retaining ring is press fitted into the gas chamber so that the projections are elastically deformed by press contact with the inner wall of the housing defining the gas chamber. Because of the elastic force, the retaining ring is engaged with the inner wall of the housing to fix the seal member in the housing. The retaining ring is able to effectively fix the seal member inside the housing even if the housing is formed from a material with relatively low ductility. This allows the housing to be formed from a material with low density and low ductility such as aluminum die-casting alloy, thereby achieving reduction in weight of the housing and thus reduction in weight of the pretensioner.

According to an exemplary embodiment, the protective member and the seal member are formed as an integral protective seal, that the retaining ring is fitted onto the outer periphery of the protective member to hold the protective seal, and that the protective seal is fixed to the inner wall of the housing by the retaining ring. The end of the seal member having a larger diameter is coupled to the protective member. By fitting the retaining ring onto the outer periphery of the protective member, the protective seal is held by the retaining ring. Then, by bringing the ring of the retaining ring in contact with the end of the seal member facing the protective member and press fitting the retaining ring into the gas chamber, the projections are elastically deformed by press contact with the inner wall of the housing defining the gas chamber. Because of the elastic force, the retaining ring is engaged with the inner wall of the housing, whereby the seal member together with the protective member is fixed to the inner wall of the housing. By forming the seal member and the protective member as a single body, the number of parts is reduced thus reducing the material cost and the assembling cost.

According to an exemplary embodiment, the outer periphery of the protective member is provided with a plurality of through holes capable of diffusing the gas. Accordingly, high temperature gas from the gas generator may pass into the protective member through the through holes and flow along grooves formed in the outer periphery of twist of the wire within the protective member. Therefore, the contact area between the high temperature gas and the wire is increased to reduce the local elevation of temperature of the wire. In addition, the temperature of the high temperature gas can be greatly cooled, thereby securely preventing the high temperature gas or a flame from spurting out of the housing.

According to an exemplary embodiment, the housing is a die-cast body formed from an aluminum alloy. This allows reduction in weight of the housing and thus allows reduction in weight of the pretensioner.

Hereinafter, a preferred embodiment of a pretensioner and a seat belt apparatus according to the present invention will be described in detail with reference to attached drawings.

Figure 1:
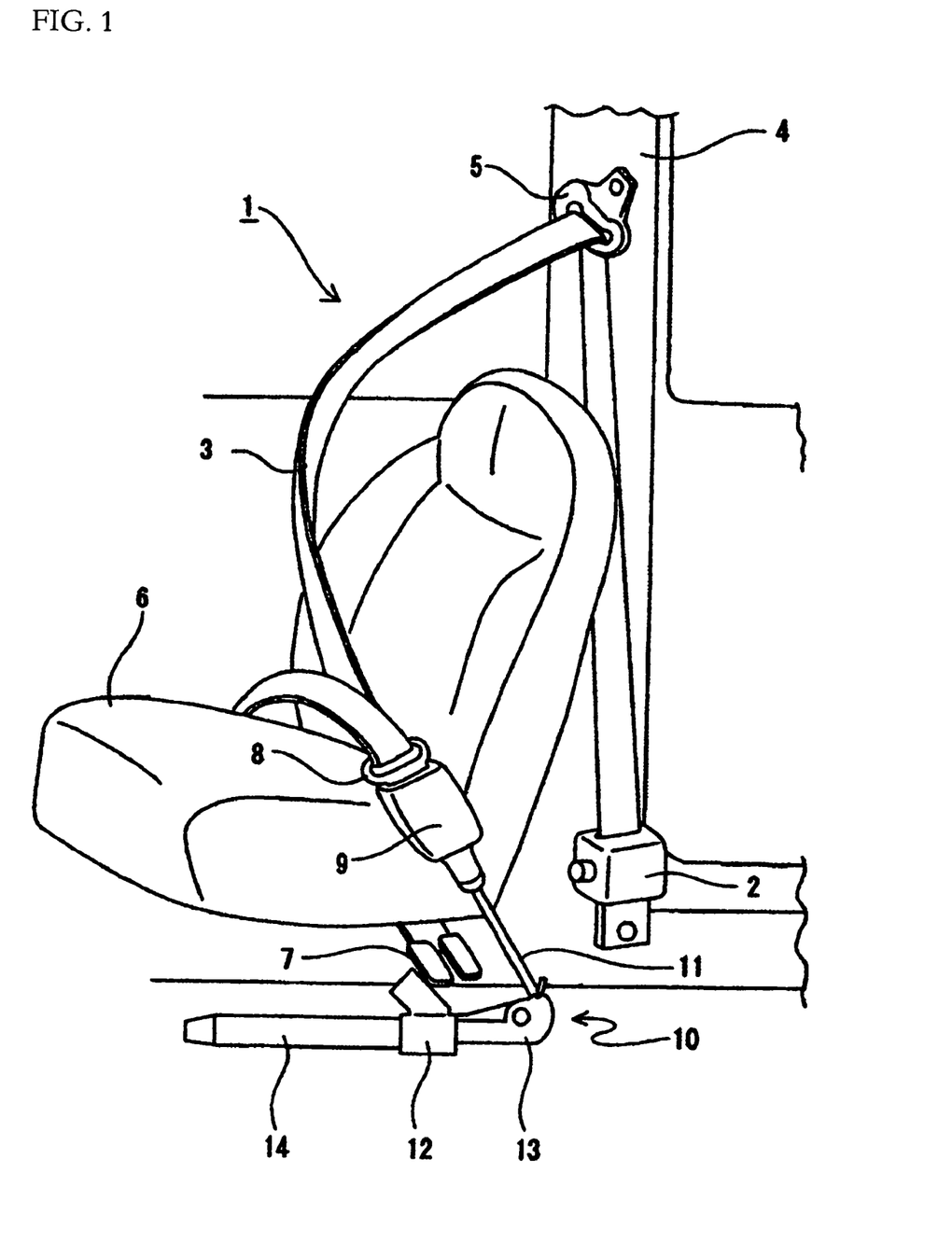
FIG. 1 is a perspective view showing a seat belt apparatus with a pretensioner.

FIG. 1 is a perspective view showing a seat belt apparatus with a pretensioner. In FIG. 1, the seat belt apparatus 1 comprises a seat belt 3 for restraining an occupant which can be withdrawn from a retractor 2. The retractor 2 is a device for winding up the seat belt 3 and is fixed to a lower portion of a center pillar 4 in a cabin of a vehicle. The seat belt 3 withdrawn from the retractor 2 to extend toward an upper portion of the vehicle passes through a through ring 5 attached to an upper portion of the center pillar 4 and is bent at the through ring 5 to extend toward a lower portion of the vehicle. The distal end of the seat belt 3 is fixed to an anchor plate 7 which is disposed between the center pillar 4 and a seat 6.

At a portion of the seat belt 3 between the through ring 5 and the anchor plate 7, a tongue 8 is attached to the seat belt 3 such that the seat belt 3 passes through the tongue 8. The tongue 8 can be detachably latched with a seat belt buckle 9 which is disposed on a side opposite to the anchor plate 7 relative to the seat 6.

The pretensioner 10 is attached to the seat belt buckle 9. The pretensioner 10 is a device for pulling the seat belt 3 via the seat belt buckle 9 when an impact is generated, for example, at the time of a sudden stop or a collision of the vehicle, thereby restraining the occupant with the seat belt 3.

According to an exemplary embodiment, the pretensioner 10 comprises a wire 11 connected to the seat belt buckle 9, a housing 12 through which the wire 11 is inserted, a cylinder 14 which is supported by one end of the housing 12, a holder 13 which is attached to the other end of the housing 12 and has a guide portion 13a and a guide hole 13b (see FIG. 2) for guiding the wire 11 toward the cylinder 14 such that a portion of the wire 11 is bent. The pretensioner 10 is mounted by fixing the housing 12 to, for example, a vehicle body (seat) directly or via a bracket (not shown).

Figure 2:
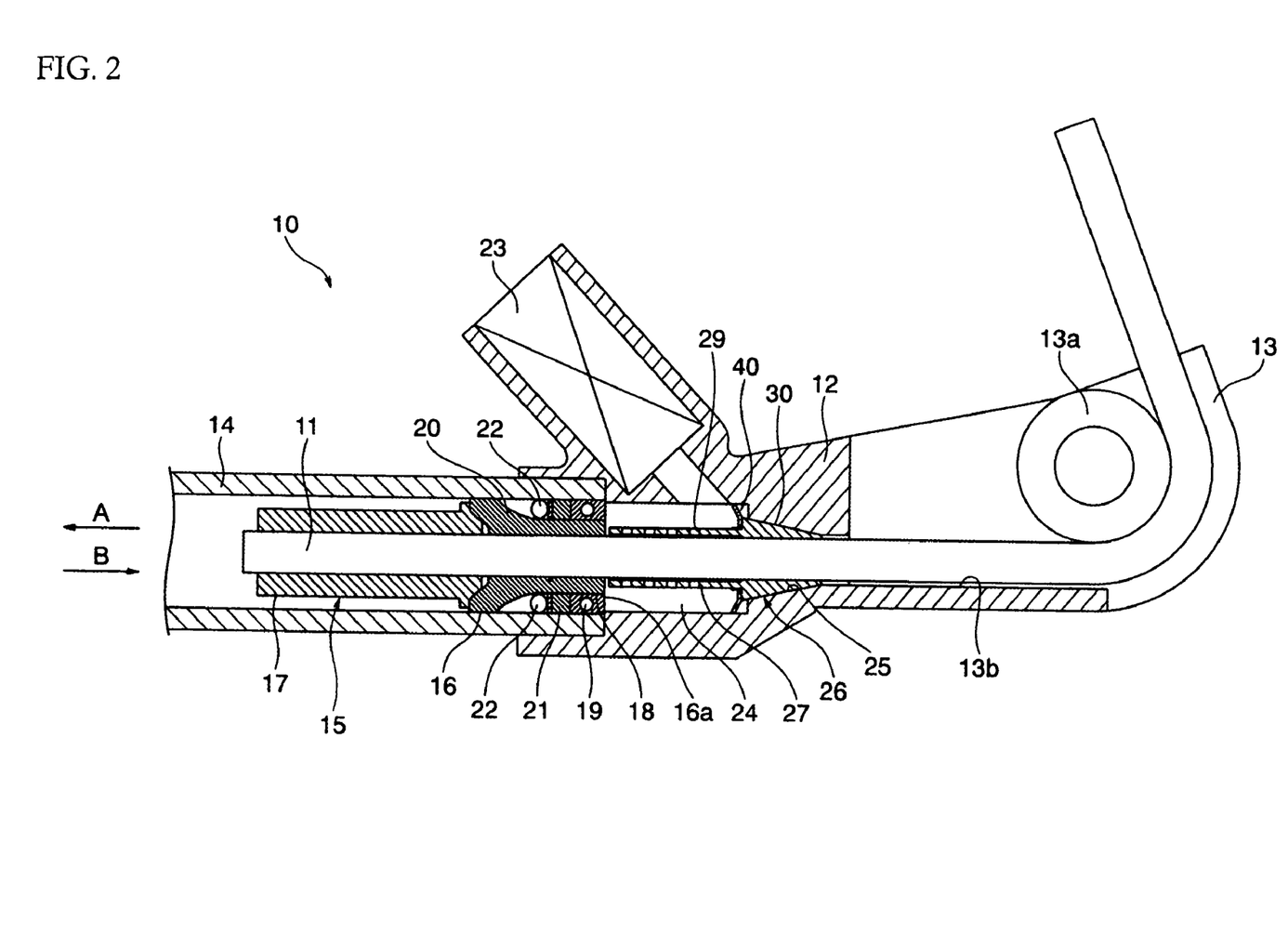
FIG. 2 is a vertical sectional view of the pretensioner shown in FIG. 1.

FIG. 2 is a vertical sectional view of the pretensioner 10. One end of the wire 11 is connected to the seat belt buckle 9 (see FIG. 1) and the other end of the wire 11 is connected to the piston 15. The piston 15 is slidably accommodated in the cylinder 14.

The piston 15 comprises a piston main body 16 through which the wire 11 is inserted, and a wire holding portion 17 which is connected to an end of the piston main body 16 and fixes the other end of the wire 11. An annular groove 18 is formed in an outer periphery of a proximal end portion of the piston main body 16. An O-ring 19 is disposed in the annular groove 18 to seal between the piston main body 16 and an inner wall of the cylinder 14.

The piston main body 16 has a tapered portion 20 that is formed on the distal end side (on the side of the wire holding portion 17) relative to the annular groove 18 and gradually increases in diameter toward the distal end side. Between the tapered portion 20 and the inner wall of the cylinder 14, a ball ring 21 and a plurality of balls 22 are arranged. This arrangement allows the piston 15 to move in a direction toward the distal end (direction A) and prevents the piston 15 from moving in a direction toward the proximal end (direction B).

The housing 12 for supporting the cylinder 14 is provided with a gas generator 23 that generates high-pressure gas for moving the piston 15 in the direction A. The gas generator 23 has a gas generating section and an ignition section which are not shown. As a rapid deceleration of the vehicle is detected by, for example, a sensor (not shown), an ignition signal is transmitted to the ignition section so that the ignition section is activated and the gas generating section spouts out high-temperature high-pressure gas into a gas chamber 24 in the housing 12.

The gas chamber (gas passage) 24 and a seal receiving portion 25 are formed inside the housing 12. The gas chamber 24 supplies the high-pressure gas spouted from the gas generator 23 to the cylinder 14. The seal receiving portion 25 communicates with a gas chamber 24 located on a side opposite to the cylinder 14 with regard to the gas chamber 24. The seal receiving portion 25 is a tapered hollow space gradually decreasing in diameter toward the holder 13.

Figure 3:
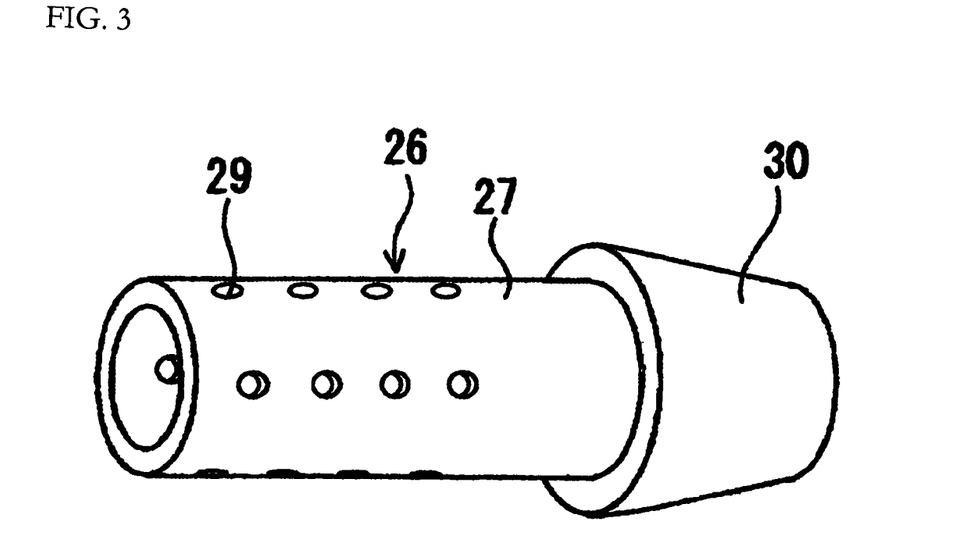
FIG. 3 is a perspective view showing a protective seal of the pretensioner shown in FIG. 1.

As shown in a perspective view of FIG. 3, a protective seal 26 comprises a protective member 27 and a seal member 30 that are integrated. The protective seal 26 is arranged in the housing 12 and is fixed in the housing 12 by a retaining ring 40. As shown in FIG. 2, the protective member 27 is a member for protecting at least an outer surface of the wire 11 exposed to the gas generator 23 from high temperature gas from the gas generator 23. In this embodiment, the protective member 27 is formed in a cylindrical shape extending to a position spaced a little from the proximal end 16a of the piston main body 16 in the gas chamber 24 so as to cover substantially the entire of the wire 11 positioned within the gas chamber 24 to protect the outer periphery thereof. It should be noted that the protective member 27 may extend to a position being in contact with the proximal end 16a of the piston body 16 in the gas chamber 24.

The seal member 30 of the protective seal 26 is formed integrally with an end of the protective member 27 opposite to the cylinder 17. The seal member 30 is arranged in the seal receiving portion 25 to seal between the gas chamber 24 and the guide hole 13b of the holder 13. The seal member 30 is a circular truncated cone-shaped annular body through which the wire 11 is inserted, and is continued to the protective member 27 at an end having a larger diameter. The seal member 30 gradually decreases in diameter toward the holder 13 corresponding to the inner diameter of the seal receiving portion 25 and has such a length that the end of the seal member 30 on the side of the protective member 27 slightly projects from the seal receiving portion 25. The protective seal 26 composed of the protective member 27 and the seal member 30 is integrally made of a rubber material such as a synthetic rubber containing various additives.

As shown in FIG. 3, the protective member 27 of the protective seal 26 is provided with a plurality of through holes 29 formed in the outer periphery thereof. The through holes 29 are formed at a plurality of locations in the circumferential direction of the protective member 27 and a plurality of locations in the longitudinal direction of the protective member 27 so that the through holes 29 are aligned. According to an exemplary embodiment, the protective member 27 comprises four through holes 29 in the circumferential direction and four through holes 29 in the longitudinal direction of the protective member 27. Since at least the outer surface of the wire exposed to the gas generator 23 in the gas chamber 24 is covered by the protective member 27 having the through holes 29, high temperature gas from the gas generator 23 is sent into the protective member 27 through the through holes 29 so as to flow the high temperature gas along grooves formed in the outer periphery of twist of the wire 11 within the protective member 27. Therefore, local elevation of temperature of the wire is prevented, whereby the wire is protected. Further, the temperature of the high temperature gas can be greatly cooled because of increased contact area of the high temperature gas relative to the wire 11, thereby securely preventing the high temperature gas (e.g. flame) from spurting out of the housing 12.

Figure 4:
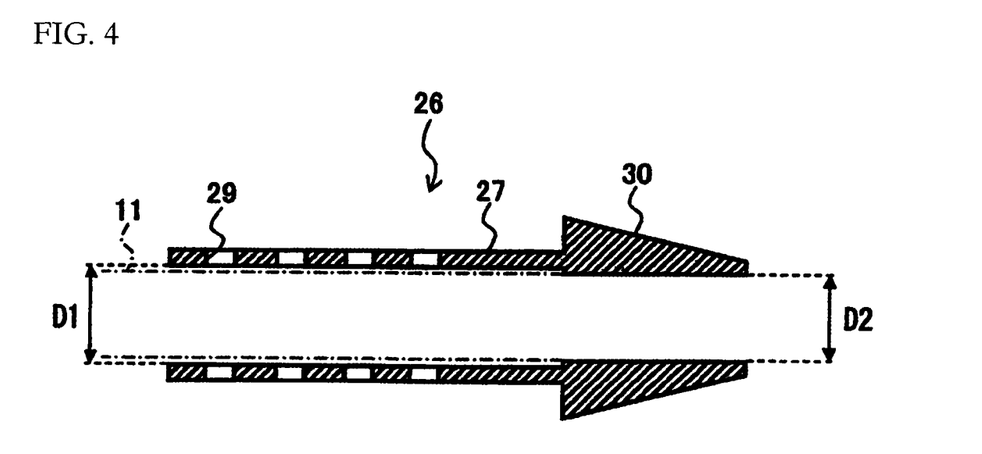
FIG. 4 is a vertical sectional view of the protective seal.

FIG. 4 is a vertical sectional view of the protective seal. As shown in FIG. 4, the inner diameter D1 of the protective member 27 of the protective seal 26 slightly larger than the outer diameter of the wire 11 so as to ensure a passage for high temperature gas flowing through the through holes 29 of the protective member 27 from the gas generator 23. The inner diameter D2 of the seal member 30 of the protective seal 26 is set to be substantially equal to or slightly smaller than the outer diameter of the wire 11 such that the wire 11 is slidable relative to the seal member 30 with keeping air tightness of the seal member 30 relative to the wire 11.

In the pretensioner 10, as the sensor detects a rapid deceleration of the vehicle due to occurrence of a sudden stop or a collision of the vehicle, an ignition signal is transmitted to the ignition section of the gas generator 23 so that high-temperature high-pressure gas is spouted out from the gas generator 23. Then, the high-pressure gas is supplied to the cylinder 14 through the gas chamber 24 in the housing 12. Thus, the piston 15 is moved in a direction A in FIG. 2 toward the cylinder 14 so that the wire 11 is pulled. According to the pulling of the wire 11, the seat belt 3 is pulled via the seat belt buckle 9, thereby increasing the restraining force for the occupant by the seat belt 3.

During this, the seal member 30 is about to be pulled according to the movement of the wire 11. To avoid this, the seal member 30, i.e. the protective seal 26 is fixed in the housing 12 not to allow the movement of the seal member 30. In this embodiment, the aforementioned retaining ring 40 is used to fix the protective seal 26 to the inside of the housing 12.

Figure 5A:
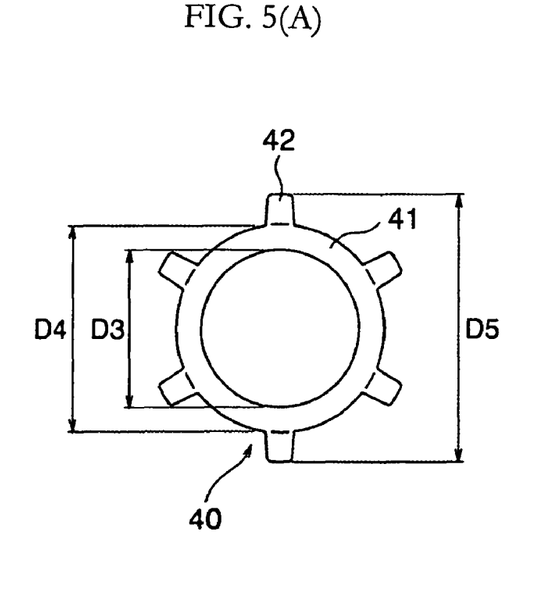
Figure 5B:
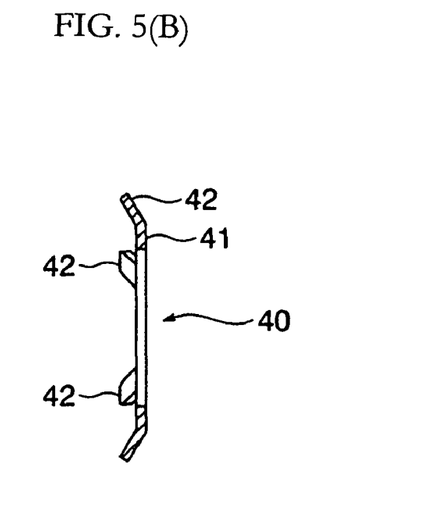

As shown in FIG. 5, the retaining ring 40 is a fixing member of a simple structure that is made of an elastic metal. The retaining ring 40 comprises a thin ring 41 and a plurality of projections 42 which are formed equiangularly to project in the radial direction from the periphery of the thin ring 42. The projections 42 are inclined in one of the axial directions of the ring 41. According to an exemplary embodiment, the retaining ring comprises six equally spaced projections 42. The inner diameter D3 of the ring 41 is set to such a size as to allow the fitting of the ring 41 onto the outer periphery of the protective member 27 of the protective seal 26. The outer diameter D4 of the ring 41 is set to a size substantially the same as or slightly smaller or larger than the outer diameter of the ring-like end 30a on the proximal side (facing the protective member 27) of the seal member 30. In addition, the distance D5 between the ends of the opposite projections 42 of the retaining ring 40 is set to a size slightly larger than the inner diameter of the gas chamber 24 of the housing 12.

Figure 6:
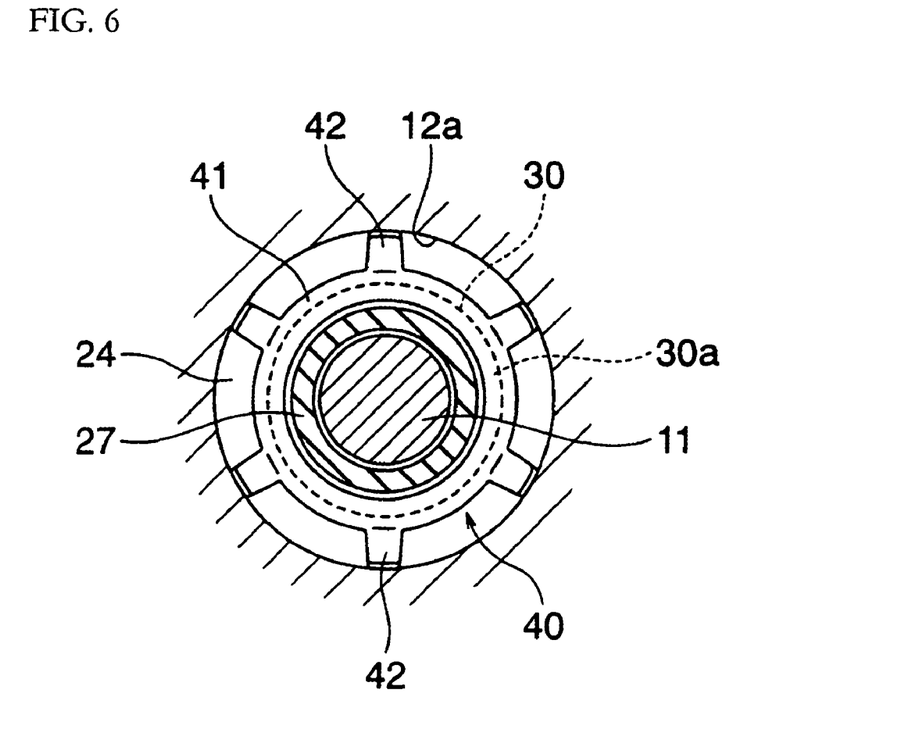
FIG. 6 is a cross sectional view showing a fixing method of the protective seal by the retaining ring shown in FIGS. 5(*a*), 5(*b*).
Figure 7:
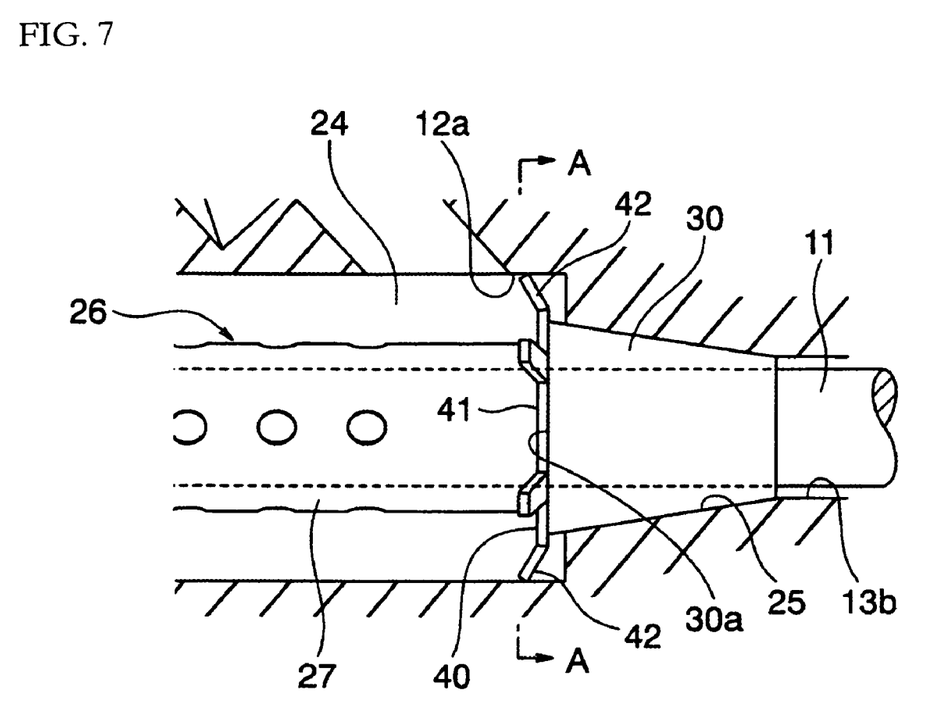
FIG. 7 is a vertical sectional view showing the fixing method of the protective seal by the retaining ring shown in FIGS. 5(a), 5(b).

FIG. 6 is a cross sectional view showing the fixing method of the protective seal and a section taken along A-A of FIG. 7. FIG. 7 is a vertical sectional view showing the fixing method of the protective seal. To fix the protective seal 26 to the inside of the housing 12, as shown in FIG. 6 and FIG. 7, the retaining ring 40 is fitted on the outer periphery of the protective member 27 of the protective seal 26 with the projections 42 of the ring 41 being inclined toward the rear and the annular end of the ring 41 is brought in contact with the annular proximal end 30a, facing the protective member 27, of the seal member 30, thereby holding the protective seal 26 to the retaining ring 40. The retaining ring 40 is pressed in the direction toward the seal receiving portion 25 and is thus inserted into the gas chamber 24 so that the projections 42 around the ring 41 are in press contact with the inner wall 12a of the housing 12 defining the gas chamber 24. Therefore, the seal member 30 is fitted into the seal receiving portion 25 in the close contact state by the pressure of the retaining ring 40, and the projections 42 are elastically deformed so that the retaining ring 40 is engaged with the inner wall 12a of the housing 12 because of the elastic force, whereby the protective seal 26, i.e. the seal member 30 and the protective member 27, is fixed to the inside of the housing 12 by the retaining ring 40.

The protective seal 26 is held by fitting the ring 41 to the protective member 27 and the retaining ring 40 holding the protective seal 26 is pressed toward the seal receiving portion 25 in the gas chamber 24, thereby engaging the retaining ring 40 with the inner wall 12a of the housing 12 because of elastic force of the elastic deformation of the projections 42 being in press contact with the inner wall 12a of the housing 12 defining the gas chamber 24.

The retaining ring 40 fixes the protective seal 26 having the seal member 30 to the inside of the housing 12. The use of the retaining ring 40 avoids the case of fixing the seal member to the inside of the housing by crimping the claws, which may be difficult if the housing is made of a material having low ductility such as aluminum die-casting alloy. The use of the retaining ring 40 therefore allows lightweight material such as aluminum die-casting alloy to be used to make the housing 12, thereby achieving reduction in weight of the housing 12 and thus reduction in weight of the pretensioner 10.

The seal member 30 and the protective member 27 are integrally formed in the aforementioned embodiment, thereby reducing the number of parts as compared to the case that the seal member 30 and the protective member 27 are separately formed and thus reducing the material cost and the assembling cost.

However, according to an alternative embodiment, the seal member 30 and the protective member 27 may be formed as separate members. If the seal member 30 and the protective member 27 are separate, only the seal member 30 is fixed to the inner wall 12a of the housing 12 by the retaining ring 40 and others are similar to those of the aforementioned embodiment. That is, the ring 41 of the retaining ring 40 is brought in contact with the end, facing the protective member 27, of the seal member 30 and the retaining ring 40 is pressed toward the seal receiving portion 25 in the gas chamber 24, thereby engaging the retaining ring 40 with the inner wall 12a of the housing 12 because of elastic force of the elastic deformation of the projections 42 being in press contact with the inner wall 12a of the housing 12 defining the gas chamber 24. In this manner, the seal member 30 is fixed.

Though the aforementioned description has been made for an example where the pretensioner 10 is a buckle pretensioner which is attached to the seat belt buckle, the pretensioner may be a lap-belt pretensioner which is attached to an anchor for fixing a distal end portion (lap belt portion) of the seat belt 3 to a vehicle floor or the like.

The priority application, Japanese Patent Application No. 2008-012446 filed Jan. 23, 2008, including the specification, drawings, claims and abstract, is incorporated herein by reference in its entirety.

What is claimed is:

1. A pretensioner for restraining an occupant with a seat belt by pulling the seat belt when an impact on a vehicle is generated, comprising:
   a wire of which one end is connected to the seat belt;
   a piston that is connected to the other end of the wire to pull the wire;
   a cylinder that accommodates the piston slidably;
   a housing through which the wire is inserted and that holds the cylinder at one end thereof;
   a holder that is located at the other end of the housing and has a guide hole for guiding the wire toward the cylinder;
   a gas generator that supplies gas for moving the piston into the cylinder through a gas chamber formed in the housing;
   a protective member for protecting the wire that is disposed in the gas chamber within the housing to cover at least an outer periphery of the wire facing the gas generator; and
   a seal member that is located within the housing at a side of the protective member opposite to the cylinder side to seal between the gas chamber and the guide hole of the holder and through which the wire is inserted,
   further comprising a retaining ring having a ring to be in contact with an end of the seal member facing the protective member and a plurality of projections to be in press contact with the inner wall of the housing that project radially outwardly from the periphery of the ring, wherein the retaining ring is press fitted into the housing so that the seal member is fixed to the inner wall of the housing by the retaining ring.

2. The pretensioner of claim 1, wherein the protective member and the seal member are formed as an integral protective seal, wherein the retaining ring is fitted onto the outer periphery of the protective member to hold the protective seal, and wherein the protective seal is fixed to the inner wall of the housing by the retaining ring.

3. The pretensioner of claim 1, wherein the outer periphery of the protective member is provided with a plurality of through holes capable of diffusing the gas.

4. The pretensioner of claim 1, wherein the housing is formed of a die-cast aluminum alloy.

5. A seat belt apparatus comprising:
   a seat belt;
   a retractor that winds up the seat belt;
   a tongue supported by the seat belt;
   a pretensioner for restraining an occupant with the seat belt by pulling the seat belt when an impact on a vehicle is generated, wherein
   the pretensioner comprises:
   a wire of which one end is connected to the seat belt;

a piston that is connected to the other end of the wire to pull the wire;

a cylinder that accommodates the piston slidably;

a housing through which the wire is inserted and that holds the cylinder at one end thereof;

a holder that is located at the other end of the housing and has a guide hole for guiding the wire toward the cylinder;

a gas generator that supplies gas for moving the piston into the cylinder through a gas chamber formed in the housing;

a protective member for protecting the wire that is disposed in the gas chamber within the housing to cover at least an outer periphery of the wire facing the gas generator; and a seal member that is located within the housing at a side of the protective member opposite to the cylinder side to seal between the gas chamber and the guide hole of the holder and through which the wire is inserted, wherein the pretensioner further comprises a retaining ring having a ring to be in contact with an end of the seal member facing the protective member and a plurality of projections to be in press contact with the inner wall of the housing that project radially outwardly from the periphery of the ring, wherein the retaining ring is press fitted into the housing so that the seal member is fixed to the inner wall of the housing by the retaining ring.

6. A seat belt pretensioner comprising:

a wire connected to a seat belt at one end and to a piston at the other end; wherein the piston is slidably positioned in a cylinder;

wherein the cylinder is positioned at one end of a housing and wherein the other end of the housing includes a holder having a guide hole for guiding the wire passing into the housing toward the cylinder;

a gas generator configured to supply gas for driving the piston; wherein the gas generator supplies gas into a gas chamber located in the housing;

a protective member positioned to cover at least an outer periphery of the wire facing the gas chamber; and wherein the wire passes through a seal member located within the housing between the gas chamber and the guide hole of the holder; and a retaining ring in contact with an end of the seal member facing the protective member, wherein the retaining ring includes a plurality of projections that project radially outwardly from the periphery of the ring and are in press contact with the inner wall of the housing so that the seal member is fixed to the inner wall of the housing by the retaining ring.

7. The pretensioner of claim 6, wherein the protective member and the seal member are formed as an integral protective seal.

8. The pretensioner of claim 7, wherein the retaining ring is fitted onto the outer periphery of the protective member to hold the protective seal.

9. The pretensioner of claim 8, wherein the protective seal is fixed to the inner wall of the housing by the retaining ring.

10. The pretensioner of claim 6, wherein the outer periphery of the protective member is provided with a plurality of holes capable for diffusing the gas.

* * * * *